Sept. 28, 1954    L. H. FLORA    2,689,992
CLIP FOR MOLDINGS, CABLES AND THE LIKE
Filed Oct. 24, 1952    2 Sheets-Sheet 1
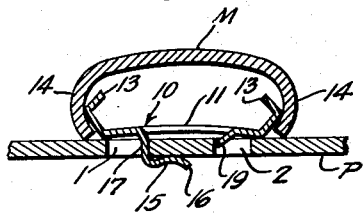
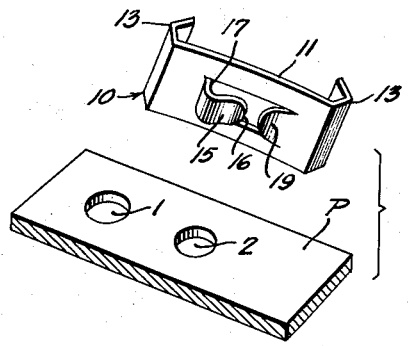
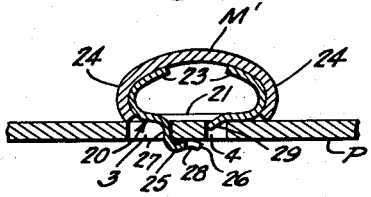
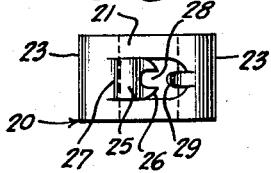
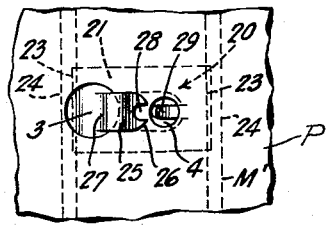
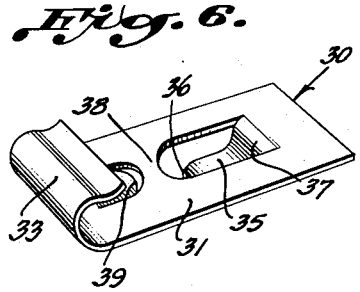
INVENTOR
LAURENCE H. FLORA
BY
ATTORNEY Sept. 28, 1954  L. H. FLORA  2,689,992
CLIP FOR MOLDINGS, CABLES AND THE LIKE
Filed Oct. 24, 1952  2 Sheets-Sheet 2
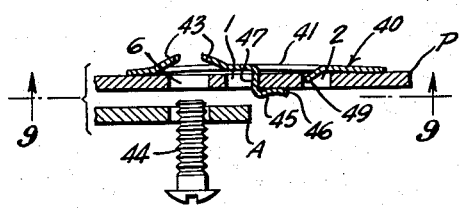
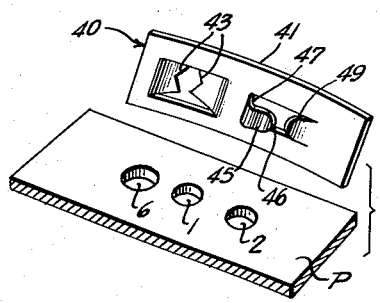
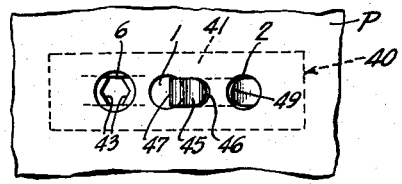
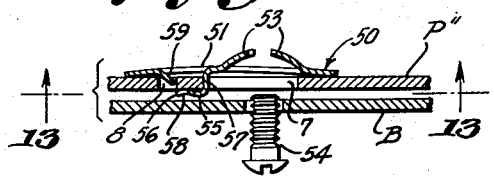
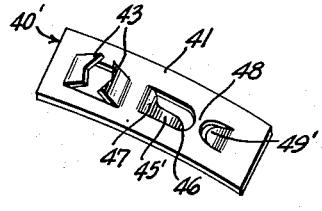
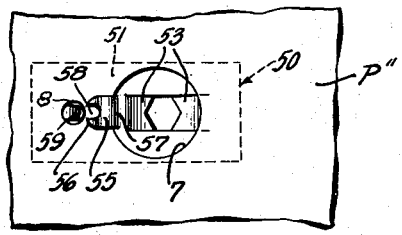
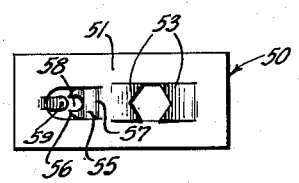
INVENTOR
LAURENCE H. FLORA
BY
ATTORNEY

Patented Sept. 28, 1954

2,689,992

UNITED STATES PATENT OFFICE 2,689,992

CLIP FOR MOLDINGS, CABLES, AND THE LIKE

Laurence H. Flora, Cleveland, Ohio, assignor to Tinnerman Products, Inc., Cleveland, Ohio, a corporation of Ohio Application October 24, 1952, Serial No. 316,673

4 Claims. (Cl. 24—73)

This invention relates to attachable types of fastening devices designed for ready attachment to an apertured supporting part to provide the same with means for securing a cooperating part thereto or for securing a structural member, object or article of manufacture to said supporting part.

The invention is directed, more particularly, to various forms of fastening devices having a clip type attaching means for securing the fastener onto an apertured supporting part together with means for retaining or mounting a cooperating part on the supporting part, or other fastening means for holding or retaining an object or article in secured relation to the supporting part.

The improved clips or fasteners of the present invention are especially advantageous for securing assemblies in which only a relatively small area is available for attaching the fasteners, or when the fasteners must be attached in small, close quarters as is required in many installations wherein space is at a premium. In this regard, the fasteners of the present invention comprise a clip type attaching means which is readily provided for attachment in a relatively small area together with a locking means adapted to retain the fastener in applied position against accidental removal, shifting or displacement.

A primary object of the invention, therefore, is to provide various forms of fasteners having an attaching means in the form of a clip or hook, or the like, which is readily received in secured relation in an opening in a supporting part together with a locking detent in the form of a tab extending toward said hook in opposed relation thereto in a manner whereby both said hook and tab are formed in a relatively small area in providing the fasteners in relatively small sizes for use in small size assemblies or in other locations where space is limited.

Another object of the invention is to provide various forms of fasteners having such a clip type attaching means in which the attaching hook and locking tab are provided in inwardly extending opposed relation, as aforesaid, and with the locking tab formed from a portion of the hook in a manner whereby both said attaching hook and locking tab are provided in an exceptionally small area of the fastener so that the fastener may be provided in the smallest of sizes that may be necessary or desirable.

A further object of the invention is to provide various types of fasteners such as described, in which the fasteners are provided with a clip type attaching means comprising a hook adapted to be easily and quickly slid into fastening position in an opening in a supporting part together with a locking tab in inwardly extending opposed relation to the extremity of said hook and which is adapted to seat in an adjacent opening in the support to lock the fastener in attached position against inadvertent disconnection or accidental loosening or displacement.

Another object of the invention is to provide various types of such fasteners of general utility in which the fasteners comprise a clip type attaching means in the form of a hook and locking tab in inwardly extending opposed relation to each other, as aforesaid, together with means for holding or retaining an article or object on the supporting part such as a cable, conduit or the like, or a bolt or screw for securing a cooperating part to said supporting part.

A further object of the invention is to provide various types of attachable fasteners of the kind described, which are adapted for attachment to supporting parts of different thicknesses.

Further objects and advantages, and other new and useful features in the construction, arrangement and general combination of elements in the various fasteners of the invention will be apparent as the following description proceeds with reference to the accompanying drawings, for purposes of illustration but not of limitation, in which like reference characters designate like parts throughout, and in which:

Fig. 1 is a vertical sectional view of a molding assembly showing a fastener in accordance with the invention as provided in the form of a molding clip or retainer attached to a supporting part and securing a molding, or the like, in mounted position on said supporting part; and, Fig. 2 is a perspective view showing a fragment of the supporting part as prepared with a perforated area for the attachment of the molding clip or retainer which is also shown in perspective in position for attachment to said supporting part.

Fig. 3 is a sectional view similar to Fig. 1 showing another form of fastener in accordance with the invention comprising a molding clip or retainer which is especially suited for mounting thin moldings and beadings, or the like, of relatively narrow cross section;

Fig. 4 is a bottom plan view of the molding clip per se shown employed in Fig. 3; and, Fig. 5 is a bottom plan view of Fig. 3 showing the underside of the supporting part with the molding clip in attached position thereon.

Fig. 6 is a perspective view of a further form of the invention as provided in a clip for mounting a cable, rod, or pipe, or the like; and, Fig. 7 is a vertical sectional view showing the clip of Fig. 6 as attached to a supporting panel and mounting an electrical wire or cable, or the like.

Fig. 8 is a vertical sectional view of an assembly showing another form of fastener in accordance with the invention as provided in a device having a nut portion for threadedly engaging a bolt or screw securing a cooperating part to the supporting part;

Fig. 9 is a view along line 9—9 of Fig. 8 showing the underside of the supporting part with the fastener attached thereto; and, Fig. 10 is a perspective view showing a fragment of the supporting part as prepared with perforations for the attachment of the fastener of Figs. 8 and 9 which is also shown in perspective in position for attachment to said supporting part.

Fig. 11 is a perspective view of a fastener similar to that shown in Figs. 8–10, inclusive, as provided with the attaching means in an alternate form.

Fig. 12 is a vertical sectional view similar to Fig. 8 showing another form of fastener having a nut portion for threadedly engaging a bolt or screw and provided with a clip type attaching means especially suited for such fasteners as provided in a relatively small size.

Fig. 13 is a view along line 13—13 of Fig. 12, looking in the direction of the arrows, and shows in bottom plan the supporting part with the fastener attached thereto; and, Fig. 14 is a top plan view of the fastener per se shown employed in Figs. 12 and 13.

The various fasteners of the invention are of general utility and may be readily constructed for use in a wide range and variety of assemblies in proportion to the size and contour of the parts secured. The fasteners are particularly suited for use in providing an apertured supporting part with means for securing thereto a cooperating part object or article of manufacture by an operation taking place entirely from one side thereof as is required in a blind location, for example.

Referring now, more particularly, to the drawings, Figs. 1 and 2 show one form of fastener in accordance with the invention as provided in a molding clip or retainer by which a molding M, trim strip, or similar object is mounted onto a supporting part P, by an operation taking place entirely from the forward or readily accessible side thereof. The molding retainers or fasteners, designated generally 10, are provided in the manner of substantial clip devices comprising combined attaching means and spring arm holding means, the attaching means being adapted to be easily and quickly applied to substantially locked fastening position in specially prepared assembling openings in the supporting part P from the outer or forward side thereof, whereupon the molding M or other object is then applied to the holding arms of the retainer in fully mounted position on the supporting structure by an operation likewise taking place from the outer or forward side thereof. Thus, there is no need for access to the rearward side of the supporting part P as is necessary when the retainers are attached by bolt and nut fastenings required to be secured together from both sides of the supporting structure.

The supporting part P, may be of any suitable material such as sheet metal, wood, fiber board, or the like; however, inasmuch as the invention is employed mainly in metallic structures, the supporting part P is usually in the form of a metallic panel or plate-like member. In order to adapt the supporting part P for use with a retainer or fastener 10, said part P is provided with a perforated area comprising a pair of spaced openings 1, 2, which may be of any suitable outline but perferably are provided as ordinary circular openings formed by a simple punching or drilling operation. The openings 1, 2, may be of substantially the same size or the opening 2 may be slightly smaller for a close, snug fit of the fastener in attached position. It will be understood that a suitable number of such perforated areas comprising such spaced openings 1, 2, are prepared in the panel P according to the number of retainers or fasteners 10 to be used, with such perforated areas being provided in predetermined spaced relation along the path which the molding M or other object to be mounted extends in mounted position on said panel P.

The molding clip 10 is constructed from a relatively small, inexpensive blank of sheet metal which is readily obtained from standard strip stock without loss or waste of material. Any suitable sheet metal may be employed but preferably that of a spring metal nature such as spring steel or cold rolled steel having spring-like characteristics. The blank is bent to define a base or body portion 11 intermediate a pair of spring arms 13 which are formed from the ends of the blank and are bent upwardly from the fastener base 11 to define means by which the molding M or other object is attached thereto by springing the longitudinal flanges 14 of the molding into secured relation with said spring arms 13.

Preferably the base or body 11 of the clip is arched or bowed upwardly as seen in Fig. 1 and is provided with an attaching hook or finger 15 and a locking detent or shoulder in the form of a tab 19 both stamped from a single cutout area of the fastener base 11 to project from the underside thereof with the ends of said hook 15 and tab 19 extending inwardly toward each other in opposed relation. It is to be appreciated that such a hook and detent construction in inwardly extending opposed relation to each other is readily provided in a relatively small area as is necessary or desirable in instances where the attaching means for the fasteners must be of relatively small size.

The hook or finger 15 extends in generally parallel and spaced relation to the underside of the fastener base 11 and is biased inwardly to provide an intermediate resilient cam surface that is normally spaced from said base 11 a distance slightly less than the thickness of the supporting part P adjoining the opening 1 so that said cam surface causes the hook to engage the adjacent surface of said part P under spring tension in the attached position of the fastener. Preferably the end of said hook 15 is provided in an outwardly flared lip 16 having a rounded extremity for facilitating the initial application of the hook 15 over the engaged marginal edge portion of the circular opening 1. The arrangement otherwise is such that the portion of the hook or finger 15 adjoining the base 11 defines an abutment 17 adapted to engage a wall of the opening 1 in the attached position of the fastener as seen in Fig. 1, while the tab or detent 19 defines a rounded projecting shoulder for snugly engaging the adjacent wall of the other circular opening 2 to lock said hook 15 in such attached position. The extremity of the locking tab 19 is rounded to conform to the contour of the associated opening 2 and is spaced from the abutment 17 of the hook 15 a distance substantially equal to or slightly greater than the distance between the wall portions of the respective openings 1, 2, engaged thereby such that the fastener is fixedly and rigidly secured in attached position against shifting or displacement.

With the molding clip or retainer 10 thus provided and the supporting part P prepared with the spaced openings 1, 2, the clip is easily and quickly applied to a positive locked attachment on the supporting part P simply by inserting the end of the hook 15 into the opening 1 and manipulating the same in a manner whereby said hook 15 is cammed against the edge of said opening 1 and is thereby flexed outwardly from the fastener base 11 as necessary to engage the underside of part P adjacent said opening 1. The outwardly flared lip 16 facilitates this initial step in applying the hook 15, and accordingly, by depressing the arched base 11 and simultaneously sliding the fastener in the direction of the free end of said hook 15, said hook 15 clears the underside of the supporting part P and permits the fastener to be advanced to its fully applied fastening position to the point at which the abutment 17 of the hook engages the adjacent wall of the opening 1, substantially as shown in Fig. 1. At this position, the locking tab 19 lies over the other opening 2 such that the extremity of said locking tab 19 snaps into engagement with the adjacent wall of said opening 2 inasmuch as the extremity thereof has a predetermined spacing from the abutment 17 on the hook for this purpose. Thus, the abutment 17 of the hook and the extremity of the locking tab 19 engage the adjacent walls of the openings 1, 2, respectively, in the manner of opposite abutments acting in opposite directions to prevent shifting or displacement of the retainer from its final applied position. Additionally, the construction by which the hook 15 and locking tab 19 are received in the spaced openings 1, 2, respectively, provides an arrangement wherein the fastener is positively held against turning or relative rotative movement on the supporting part P which, of course, is not possible in the case of a fastener having such hook type attaching means secured in a single circular opening in a supporting part.

A retainer or fastener of this character is advantageously provided with an arched or bowed body 11 which may be depressed as necessary to permit the hook 15 to engage the underside of supporting parts of different thicknesses and otherwise compensate for manufacturing variations and irregularities in the thickness of the part P in the area of the attaching opening 1 therein. However, while such an arched base or body construction is preferable, it is not absolutely essential inasmuch as the inwardly biased formation of the hook 15 provides for a limited yielding of said hook as necessary to engage supporting parts of slightly different thicknesses or having slight variations or irregularities adjacent the attaching opening 1.

In the foregoing manner, a suitable number of molding clips or retainers 10 are attached to the supporting part P as shown in Fig. 1 along the patch which the molding M or other object extends in mounted position on said supporting part. The molding M may be provided of any suitable cross section, but is usually in the form of a substantial channel shape including longitudinal inturned flanges 14 which are readily sprung onto the spring arms 13 of the retainers 10 by substantial snap fastening engagement therewith. Preparatory to mounting the molding M, the said spring arms 13 of the clips extend longitudinally of the inturned flanges 14 of the molding and accordingly, when the molding M is placed thereon and pressed downwardly, said spring arms 13 are caused to flex gradually inwardly toward each other until the flanges 14 of the molding M snap over and firmly and rigidly engage the substantial shoulders presented by said spring arms 13. The arrangement preferably is in the nature of a snap fastening action but may also be provided for in any other suitable manner by which the molding or other object is easily and quickly secured to holding means on the clips or retainers 10 in fully mounted position on the supporting part P.

Figs. 3, 4 and 5 show another form of the invention in which the fastener is provided as a clip or retainer 20 in a relatively small size for mounting a thin molding M', beading or trim strip, or the like, of relatively narrow cross section. The clip 20 has the same general application and use as that described with reference to Figs. 1 and 2 but is constructed from a much smaller blank to provide a relatively small base 21 having similar spring arms 23 adapted for snap fastening engagement with the flanges 24 of a narrow beading or molding M', as shown in Fig. 3. A similar hook 25 stamped from the fastener base includes an abutment 27 and an outwardly flared lip 26 on the extremity thereof. The hook 25 and cooperating locking tab or detent 29 are provided, similarly, in opposed inwardly extending relation toward each other.

However, in order to provide the hook 25 and locking tab 29 in a much smaller, minimum area for such a small size fastener, they are formed in a special construction by which said locking tab 29 is provided from a slotted portion 28 in the end of the hook 25, as shown in Fig. 4, such that the locking tab depends from the fastener base 21 but actually is formed from the material of said hook 25. The hook 25 and locking tab 29 are thus provided in a highly advantageous small size construction adapted to be secured in the perforations 3, 4, in the supporting part P with the hook 25 attached in the larger opening 3 and the tab 29 received in the smaller opening 4 to lock the clip in attached position, whereupon the molding M' is applied to mounted position on the spring arms 23 of the clip in the same general procedure described with reference to the molding clip of Figs. 1 and 2.

Figs. 6 and 7 illustrate a further embodiment of the invention in which the fastener is provided as a clip or retainer 30 for a cable, wire, rod, conduit or other elongate object to be mounted on a panel P, or the like. The fastener 30 is constructed similarly to that described with reference to Figs. 1 and 2 to comprise a base 31 having a spring arm 33, or the like, for holding an object such as an electrical wire or cable C by a clasping action substantially as shown in Fig. 7. A similar hook 35 is stamped from the base 31 as shown in Fig. 3 to include an abutment 37 and an outwardly flared lip 36 on its extremity. The hook 35 and cooperating locking tab 39 are likewise provided in opposed inwardly extending relation toward each other but with their extremities spaced apart by an intermediate web 38. This construction permits the hook 35 and tab 39 to be formed with the advantageous rounded extremities without need for removing the intermediate web 38 in a special operation requiring a thin, fragile cutter which must be frequently replaced. The clip 30 is attached to the supporting part P in substantially the manner described with reference to Figs. 1 and 2 with the rounded extremity on the flared lip 36 of the hook 35 facilitating the initial application of said hook 35 to attached position in the opening 1, as shown in Fig. 7, and with the rounded extremity on the locking tab 39 seating snugly against the circular wall of the opening 2 to provide a rigid, tight fit of the fastener in attached position on said supporting part P.

Figs. 8–10, inclusive, show another form of the invention in which the fastener 40 is provided with a nut portion 43 and is adapted to be attached in self-sustained fastening position on a supporting panel P preparatory to the application of a cooperating bolt or screw 44 to said nut portion 43 to secure a cooperating part A to said supporting panel P. The fastener 40 preferably is formed with a generally arched or bowed base 41 for the purposes and advantages described with reference to the fastener of Figs. 1 and 2 and is provided with a similar hook 45 stamped therefrom having an abutment 47 and an outwardly flared lip 46 on the end thereof terminating preferably in a rounded extremity. The hook 45 is thus provided on one end of said base 41 together with the locking tab 49 having a rounded extremity and extending inwardly in opposed relation to said hook 45. The other end of said base 41 is provided with a nut portion in the form of integral tongues 43, or the like, for threadedly engaging the bolt or screw 44 in the manner of a nut.

Such tongues 43 or equivalent thread engaging means may be pressed, stamped, extruded or otherwise provided on the fastener base 41 in any suitable form or construction so long as the same threadedly engage with the thread of the bolt or screw 44 in the manner of a nut, and, in this relation, the present invention fully contemplates the provision of such thread engaging means in various other similar and related forms, as in the manner of a substantial perforated protuberance which is pressed from the sheet metal and shaped to provide a helical thread or thread opening, or other wise has the wall thereof tapped to provide a plurality of thread convolutions for threadedly engaging the bolt or screw 44. Such thread engaging means prepared in the form of cooperating, yieldable tongues 43, as shown, are possessed of unusual inherent strength and will not collapse or pull through when the bolt or screw 44 is tightened, nor loosen under continuous strain and vibration in the installation. This takes place by reason of the fact that the sheet metal material from which such tongues 43 are formed is of less thickness than the pitch or spacing between adjacent thread convolutions of the bolt or screw 44, wherefore the extremities of said tongues 43 tend, more effectively, to move toward each other and cut into the grooves intermediate the adjacent thread convolutions on the bolt or screw when tightened therewith and otherwise become embedded in the root of the bolt or screw in locked, frictional fastening engagement therewith in applied fastening postion.

The fastener 40 is attached to the supporting part P in the same general manner as the fastener of Figs. 1 and 2 with the hook 45 received in the similar opening 1 and the locking tab 49 received in the opening 2, and with the nut portion 43 aligned with a suitable passage 6 prepared in the part P along with said openings 1 and 2, as illustrated in Fig. 10. The fastener 40 is thus attached in self-sustained fastening position on the part P in readiness for the application of the bolt or screw 44 through the passage 6 into threaded engagement with the threaded engaging means 43 to secure the cooperating part A to said supporting part P.

Fig. 11 shows a fastener 40′ similar to that of Figs. 8–10, inclusive, as provided with the attaching means in the alternate form in which the hook 45′ and locking tab 49′ are provided with a web 48 between the ends thereof so that said hook 45′ and tab 49′ may be provided with the advantageous rounded extremities without need for removing said intermediate web 48, substantially as described with reference to the fastener of Figs. 6 and 7.

Figs. 12–14, inclusive, show a further embodiment of the invention in which the fastener 50 is provided with a nut portion comprising integral tongues 53 formed from the base 51 of the fastener as described with reference to the fastener of Figs. 8–10, inclusive. This nut type of fastener 50, likewise, is adapted to be attached in self-sustained fastening position on a supporting panel P″ preparatory to the application of a cooperating bolt or screw 54 to said tongues 53 to secure a cooperating part B to said supporting panel P″. The fastener 50 preferably is provided with a generally arched or bowed base 51 with the nut portion 53 formed at one end thereof. The hook 55 and locking tab 59 are stamped from said base 51 adjacent said nut portion 53 with said hook 55 being provided in the same general form to include an outwardly flared lip 56 on its extremity and an abutment 57 adjoining the base 51. The hook 55 and locking tab 59 are provided in the advantageous small size construction described with reference to the clip of Figs. 3–5, inclusive, in which the locking tab 59 is provided from a slotted portion 58 in the end of the hook, as shown in Fig. 14, such that the locking tab 59 depends from the fastener base 51 but is actually provided from the material of said hook 55.

In attaching the fastener 50, thus provided, the supporting part P″ is prepared with an enlarged hole 7 serving both as a passage for the bolt or screw 54 and as an attaching opening by which the hook 55 is passed through said hole 7 to engage the underside of said part P″ adjacent said hole 7 in the attached position of the fastener as shown in Figs. 12 and 13. The locking tab 59 is received in a smaller opening 8 prepared in the supporting part P″ in predetermined spaced relation to the hole 7 to lock the fastener in attached position with the nut portion 53 aligned with the hole 7 in readiness for the application of the bolt or screw 54 to said nut portion 53 to secure the cooperating part B to said supporting part P″. In this regard, the locking tab 59, as seated in the smaller hole 8, advantageously prevents relative turning or rotation of the fastener 50 along with the bolt or screw 54 as it is turned into threaded engagement with the nut portion 53, whereas the fastener would otherwise be subject to such turning or rotation of the fastener relative to the supporting part P″ if attached solely by the hook 55.

The fastener in any form preferably is constructed of relatively thin sheet metal the thickness of which is selected according to service requirements and the predetermined size of the parts to be secured. The fasteners are most effective when provided of spring metal suitably spring tempered and otherwise treated to give the desired toughness and hardness, particularly in the case of devices intended for use in heavy duty applications. A cheap and highly practical fastener, in any form, may be provided from cold rolled metal such as cold rolled steel which is untempered but of a spring metal nature and capable of providing an effective and reliable fastener, as and for the purposes described.

While the invention has been described in detail with specific examples, such examples are intended as illustrations only inasmuch as the invention fully contemplates various modifications which may be provided without departing from the spirit and scope of the invention.

What is claimed is:

1. A fastener comprising a piece of sheet metal defining a base adapted to seat on a support over spaced openings in said support, a hook and cooperating shoulder both spaced inwardly from the ends of said base and projecting from the underside of said base in spaced relation to each other with said shoulder being shorter than said hook and facing the free end of said hook, said hook and shoulder being receivable in said spaced openings in said support, said hook being adapted to engage the marginal portion of one of said openings in the attached position of the fastener and said shoulder being adapted to abut the wall of the other opening to retain said hook in said attached position of the fastener, and means on said fastener base for engaging an object to be fastened.

2. A fastener comprising a piece of sheet metal defining an upwardly arched base adapted to seat on a support over spaced openings in said support, said arched base having a partially severed area providing a hook and cooperating tab both spaced inwardly from the ends of said base and projecting from the underside of said base in spaced relation, said hook being biased toward said arched base and having its free end flared outwardly from said base, said tab being shorter than said hook and having a free end extending inwardly toward the free end of said hook, said hook and tab being receivable in said spaced openings in said support, said hook being adapted to engage the marginal portion of one of said openings in the attached position of the fastener and said free end of the tab being adapted to abut the wall of the other opening to retain said hook in said attached position of the fastener, and means on said arched base for engaging an object to be fastened.

3. A fastener comprising a piece of sheet metal defining a base adapted to seat on a support over spaced openings in said support, a hook and cooperating tab both spaced inwardly from the ends of said base and projecting from the underside of said base, said hook having a slotted portion in the end thereof and said tab being provided from the material of said slotted portion, said tab being shorter than said hook and having a free end extending inwardly toward the free end of said hook, said hook and tab being receivable in said spaced openings in said support, said hook being adapted to engage the marginal portion of one of said openings in the attached position of the fastener and said free end of the tab being adapted to abut the wall of the other opening to retain said hook in said attached position of the fastener, and means on said fastener base for engaging an object to be fastened.

4. A fastener comprising a piece of sheet metal defining an upwardly arched base adapted to seat on a support over spaced openings in said support, said arched base having a partially severed area defining a hook and cooperating tab both spaced inwardly from the ends of said base and projecting from the underside of said base, said hook having a slotted portion in the end thereof and said tab being provided from the material of said slotted portion, said tab being shorter than said hook and having a free end extending inwardly toward the free end of said hook, said hook being biased toward said arched base and having its free end flared outwardly from said base, said hook and tab being receivable in said spaced openings in said support with said hook adapted to engage the marginal portion of one of said openings in the attached position of the fastener and said free end of said tab adapted to abut the wall of the other opening to retain said hook in said attached position of the fastener, and means on said arched base for engaging an object to be fastened.

References Cited in the file of this patent

UNITED STATES PATENTS

| Number | Name | Date |
|---|---|---|
| 1,905,372 | Duffy | Apr. 25, 1933 |
| 2,054,471 | Tinnerman | Sept. 15, 1936 |
| 2,115,312 | Lombard | Apr. 26, 1938 |
| 2,168,721 | Tinnerman | Aug. 8, 1939 |
| 2,251,644 | Tinnerman | Aug. 5, 1941 |
| 2,337,239 | Hall | Dec. 21, 1943 |